(12) United States Patent
Isherwood et al.

(10) Patent No.: US 10,489,750 B2
(45) Date of Patent: Nov. 26, 2019

(54) INTELLIGENT TASK SCHEDULER

(71) Applicant: SAP SE, Walldorf (DE)

(72) Inventors: Donovan Anthony Isherwood, Pretoria (ZA); Jhani Adre Coetzee, Pretoria (ZA); Charl Van Der Westhuizen, Pretoria (ZA); Hubert Hesse, Potsdam (DE); Marek Piotr Zielinski, Pretoria (ZA); Jan Harm Petrus Eloff, Pretoria (ZA); Ernest Ketcha Ngassam, Pretoria (ZA)

(73) Assignee: SAP SE, Walldorf (DE)

( * ) Notice: Subject to any disclaimer, the term of this patent is extended or adjusted under 35 U.S.C. 154(b) by 1078 days.

(21) Appl. No.: 13/927,613

(22) Filed: Jun. 26, 2013

(65) Prior Publication Data

US 2015/0006222 A1 Jan. 1, 2015

(51) Int. Cl.
*G06Q 10/10* (2012.01)
(52) U.S. Cl.
CPC .................. *G06Q 10/1097* (2013.01)
(58) Field of Classification Search
CPC ........................................................ G06Q 10/10
USPC ........................................................... 705/7.12
See application file for complete search history.

(56) References Cited

U.S. PATENT DOCUMENTS

| | | | |
|---|---|---|---|
| 5,790,974 A | 8/1998 | Tognazzini | |
| 6,415,259 B1 * | 7/2002 | Wolfinger | G06Q 10/06311 705/7.13 |
| 6,732,080 B1 | 5/2004 | Blants | |
| 6,850,609 B1 | 2/2005 | Schrage | |
| 7,340,395 B2 | 3/2008 | Gurram et al. | |
| 7,406,413 B2 | 7/2008 | Geppert et al. | |
| 7,539,086 B2 | 5/2009 | Jaroker | |
| 8,024,196 B1 | 9/2011 | Wodtke et al. | |
| 8,620,713 B2 | 12/2013 | Schaad | |
| 2005/0207548 A1 * | 9/2005 | Moore | H04M 3/2281 379/112.1 |
| 2006/0167686 A1 | 7/2006 | Kahn | |
| 2008/0085742 A1 * | 4/2008 | Karukka | G10L 15/26 455/557 |
| 2008/0154590 A1 | 6/2008 | Doyle | |

(Continued)

OTHER PUBLICATIONS

Kato, The future of voice-processing technology in the world of computers and communication, Oct. 24, 1995, Proc. Natl. Acad. Sci., 10061-10062 (Year: 1995).*

(Continued)

*Primary Examiner* — Renae Feacher
*Assistant Examiner* — Venay K Puri
(74) *Attorney, Agent, or Firm* — Jones Day

(57) ABSTRACT

One or more portions of a phone conversation may be captured. Text results of the one or more portions of the phone conversation may be received. The text results may be obtained from conversion of the one or more portions of the phone conversation to text. Key phrases and respective task attributes mapped to the key phrases may be retrieved from a database. One or more key phrases from the key phrases may be identified in the text results. Text following the one or more key phrases in the text results may be assigned as one or more task attribute values of one or more task attributes mapped to the one or more key phrases. A task corresponding to the one or more task attribute values may be scheduled in a calendar.

19 Claims, 5 Drawing Sheets

(56) References Cited

U.S. PATENT DOCUMENTS

| | | | |
|---|---|---|---|
| 2008/0172332 A1* | 7/2008 | Tsang | G06Q 20/04 |
| | | | 705/45 |
| 2009/0016501 A1* | 1/2009 | May | H04M 1/654 |
| | | | 379/93.09 |
| 2009/0271716 A1* | 10/2009 | Jones | G06Q 10/109 |
| | | | 715/758 |
| 2010/0293029 A1 | 11/2010 | Olliphant | |
| 2011/0043652 A1 | 2/2011 | King et al. | |
| 2012/0035925 A1 | 2/2012 | Friende et al. | |
| 2012/0239451 A1* | 9/2012 | Caligor | G06Q 10/00 |
| | | | 705/7.21 |
| 2013/0085903 A1* | 4/2013 | Cottingham | G06Q 30/04 |
| | | | 705/30 |
| 2013/0246526 A1 | 9/2013 | Wu et al. | |
| 2014/0074483 A1 | 3/2014 | van Os | |
| 2014/0119554 A1* | 5/2014 | Chan | H04R 1/1091 |
| | | | 381/74 |
| 2015/0006217 A1* | 1/2015 | Buehl | G06Q 10/1095 |
| | | | 705/7.19 |

OTHER PUBLICATIONS

Khan, Mobile Phone Sensing Systems: A Survey, First Quarter 2013, IEE Communications Surveys & Tutorials, 408 (Year: 2013).*

* cited by examiner

100

300

400

INTELLIGENT TASK SCHEDULER

BACKGROUND

A mobile device is often the primary computing device used by individuals to manage their tasks. For example, a plumber may use a smart phone to schedule future jobs, keep track of inventory, and record expenses and income. However, users may find it challenging to record and/or schedule tasks using a mobile device in certain circumstances. For example, a plumber may receive calls for new jobs, but due to the typical environment in which the plumber works, he/she may not always have the ability to record and schedule the new jobs while working.

DETAILED DESCRIPTION

Embodiments may be discussed in systems to efficiently schedule tasks in a calendar. In an embodiment, one or more portions of a phone conversation may be captured. Text results of the one or more portions of the phone conversation may be received. The text results may be obtained from conversion of the one or more portions of the phone conversation to text. Key phrases and respective task attributes mapped to the key phrases may be retrieved from a database. One or more key phrases from the key phrases may be identified in the text results. Text following the one or more key phrases in the text results may be assigned as one or more task attribute values of one or more task attributes mapped to the one or more key phrases. A task corresponding to the one or more task attribute values may be scheduled in a calendar.

In an embodiment, prior to assigning the task attribute values, phrases matching phrases from a word list may be removed from the text results. In an embodiment, scheduling rules may be retrieved from a database. Available time slots in the calendar may be determined. Each scheduling rule from the scheduling rules may be applied to each available time slot from the available time slots. A respective rating of each available time slot may be determined based on the application of each scheduling rule. The task may be scheduled in an available time slot with the highest respective rating. In an embodiment, the available time slots may be determined based on the one or more task attribute values. In an embodiment, only portions of the phone conversation spoken by the phone user may be captured. In an embodiment, in response to scheduling the task, a notification with details associated with the task may be sent to one or more participants of the phone conversation.

A mobile device is often the primary computing device used by individuals to manage their tasks. For example, a plumber may use a smart phone to schedule future jobs, keep track of inventory, and record expenses and income. However, users may find it challenging to record and/or schedule tasks using a mobile device in certain circumstances. For example, a plumber may receive calls for new jobs, but due to the typical environment in which the plumber works, he/she may not always have the ability to record and schedule the new jobs while working. This issue may be addressed by automatically capturing the details from the phone calls and optimally scheduling the task(s) discussed during the phone calls.

Figure 1:
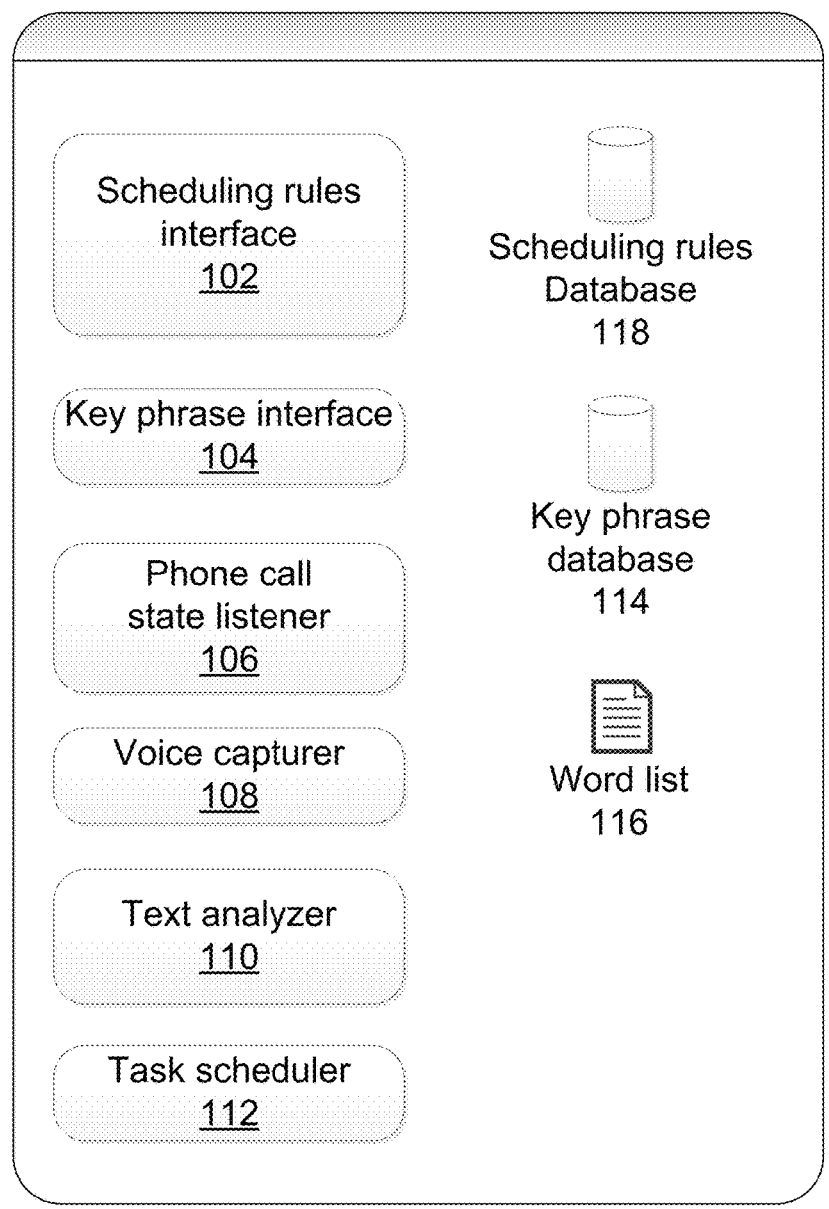
FIG. 1 illustrates a block diagram of a context based task scheduler according to an embodiment.

FIG. 1 illustrates a block diagram of a context based task scheduler 100 according to an embodiment. The key phrase interface 104 may be utilized by a user to add key phrases to the key phrase database 114. A phrase may include a set of one or more words in a particular order. The key phrase database 114 may include phrases to be identified from a phone conversation. The phone call state listener (PCSL) 106 may detect state changes to a phone call such as "idle," "call in progress," "ringing," etc. The voice capturer 108 may record phone conversations or portions of phone conversations. The recorded portions of phone conversations may be converted to text corresponding to the spoken words from the recorded portions and the text analyzer 110 may analyze this text to determine the attributes of a task to be scheduled. When analyzing the converted text, the text analyzer 110 may ignore any words or phrases from the converted text found in the word list 116. The task scheduler 112 may schedule a task in the user's calendar using the task attributes determined by the text analyzer 110 and the scheduling rules in database 118. The user may specify the rules in scheduling rules database 118 via a scheduling rules interface 102.

The context based task scheduler 100 may be utilized to intelligently schedule a task in the user's calendar based on phone calls made by the user. A task may be defined by a set of attributes based on the context of the task. For example, a business appointment (task) to be scheduled may include attributes such as the "first name" of the client, the "last name" of the client, the "address" of the client, the "purpose" of the appointment, and "preferred times" for the appointment. The key phrase interface 104 may be utilized by the user to enter phrases from a typical phone conversation that signal that one or more words following the phrases in the conversation are attribute values. Returning to the business appointment example, the user may map the "address" attribute to the key phrase, "your address is." Thus, in a phone conversation, one or more words following the key phrase "your address is" may be the value of the "address" attribute (i.e., the address of the client). The user may map multiple key phrases to a single attribute. For example, the user may additionally map the "address" attribute to the key phrase, "you stay at." Consequently, in the phone conversation, one or more words following either the key phrase, "your address is," or the key phrase, "you stay at," may be the value of the "address" attribute. In an embodiment, multiple attributes may be mapped to a single key phrase. For example, the key phrase, "your name is," may be mapped to the "first name" attribute and the "last name" attribute. In an embodiment, the user may additionally specify the order of the attribute values via the key phrase interface. For example, the user may specify that the first attribute value spoken after the key phrase, "your name is," is the value of the "first name" attribute and that the second attribute spoken after the same key phrase is the "last name" attribute. Specifically, for example, if a portion of the phone conversation is "your name is John Smith," the first attribute, "John," may be the value of the "first name" attribute and "Smith" may be the value of the "last name" attribute. In an embodiment, the user may specify the number of words which represent an attribute value via the key phrase interface 104. For example, the user may specify that the value of the "first name" attribute is a single word. The information specified by the user via the key phrase interface 104 may be stored in the key phrase database 114.

When the PCSL 106 detects that a phone call is in progress, the voice capturer 108 may record the phone conversation. In an embodiment, the voice capturer 108 may only record portions of the phone conversation. For example, due to privacy implications, the voice capturer 108 may only record portions of the conversation on the phone user's end. In an embodiment, the voice capturer 108 may record audio captured by the microphone or an in-line device of the user's mobile phone.

The recorded portions of phone conversations may be converted to text by a voice to text converter (not shown). The text analyzer 110 may analyze the converted text to determine the attributes of tasks to be scheduled. When analyzing the converted text, the text analyzer 110 may ignore any words or phrases from the converted text found in the word list 116. In an embodiment, the text analyzer 110 may, during a first pass, remove any words or phrases from the converted text matching the words or phrases in word list 116. The text analyzer may then determine task attribute values on a second pass and generate tasks from the task attribute values. The task scheduler 112 may then schedule the generated tasks in the user's calendar using the task attribute values determined by the text analyzer 110 and the scheduling rules in database 118. The user may specify the rules in scheduling rules database 118 via the scheduling rules interface 102. The user specified scheduling rules define how tasks should be scheduled. The scheduling rules may include the user's preferences such as preferred business appointment times and constraints such as the maximum travel distance to the business appointment.

For each scheduling rule, the user may provide a description of the rule, a function that defines the rule, the input parameters required by the rule function, and/or the rule priority. Each function's input may include a calendar time slot and the other parameters that define the rule. Exemplary rules may include 1) rules relating to the user's preferred scheduling times—e.g., scheduling a task outside defined working hours is to be avoided, 2) rules relating to the user's preferred clustering of tasks—e.g., the user may prefer to group similar tasks and/or related tasks together, 3) rules relating to the user's travel distance—e.g., the user may prefer to work on tasks in a limited geographical area, or group business appointments (tasks) in close proximity, and/or 4) rules relating to context information—e.g., certain service providers (users) may not be able to work in particular weather conditions or traffic conditions.

For each scheduling rule, the scheduling rules database 118 may store the following: rule description, rule function, input parameters (for the function), and/or rule priority (weight). The output of a scheduling rule's function may be a rating of an input time slot. A higher rating may indicate a time slot with a higher user preference. For example, a user may define a rule that specifies that the user would prefer not to work outside of working hours and to allocate −20 points for every time slot outside of working hours, with a priority of 4. The points (rating) may quantify the preference of the user. For example, 0 points may indicate a neutral preference of the user, 10 points may indicate a positive preference of the user, 20 points may indicate a more positive preference than 10 points, −10 points may indicate a negative preference, and −20 points may indicate a more negative preference than −20 points. In this example, the function may be defined as:

$$f(d, t, minTime, maxTime) = \begin{cases} 0 & \text{if } t \in [minTime, maxTime] \\ -20 & \text{if } t \notin [minTime, maxTime] \end{cases}$$

In the above function, d is the date of the time slot, t is the time of the time slot, minTime is the input parameter for the earliest time the user prefers to start work, and maxTime is the input parameter for the latest time the user prefers to work. The rule may be stored in the database 118 as: "Working hours", $$f(d, t, minTime, maxTime) = \begin{cases} 0 & \text{if } t \in [minTime, maxTime] \\ -20 & \text{if } t \notin [minTime, maxTime] \end{cases},$$

minTime=8:00, maxTime=18:00, 4 (rule priority/weight).

The task scheduler may iterate through the available time slots in the user's calendar and calculate the output of the above function for each available time slot. The task scheduler may then schedule the respective task in the time slot which yields the highest number of points/rating (i.e., the highest user preference).

The above database entry and implementation are illustrative and are not meant to restrict the scope of the invention. The exact representation of the scheduling rules in database 118 may vary in different embodiments.

The task scheduler may utilize various software/hardware components to determine the context necessary to evaluate the rules. For example, the task scheduler may utilize global positioning system (GPS) functionality or cell phone tower triangulation to determine the location of the user, traffic identification functionality to determine the time required for the user to travel from one location to the other, etc. The necessary software/hardware components may be present in the mobile device of the user and/or may be external to the mobile device (such as a third party service).

Figure 2:
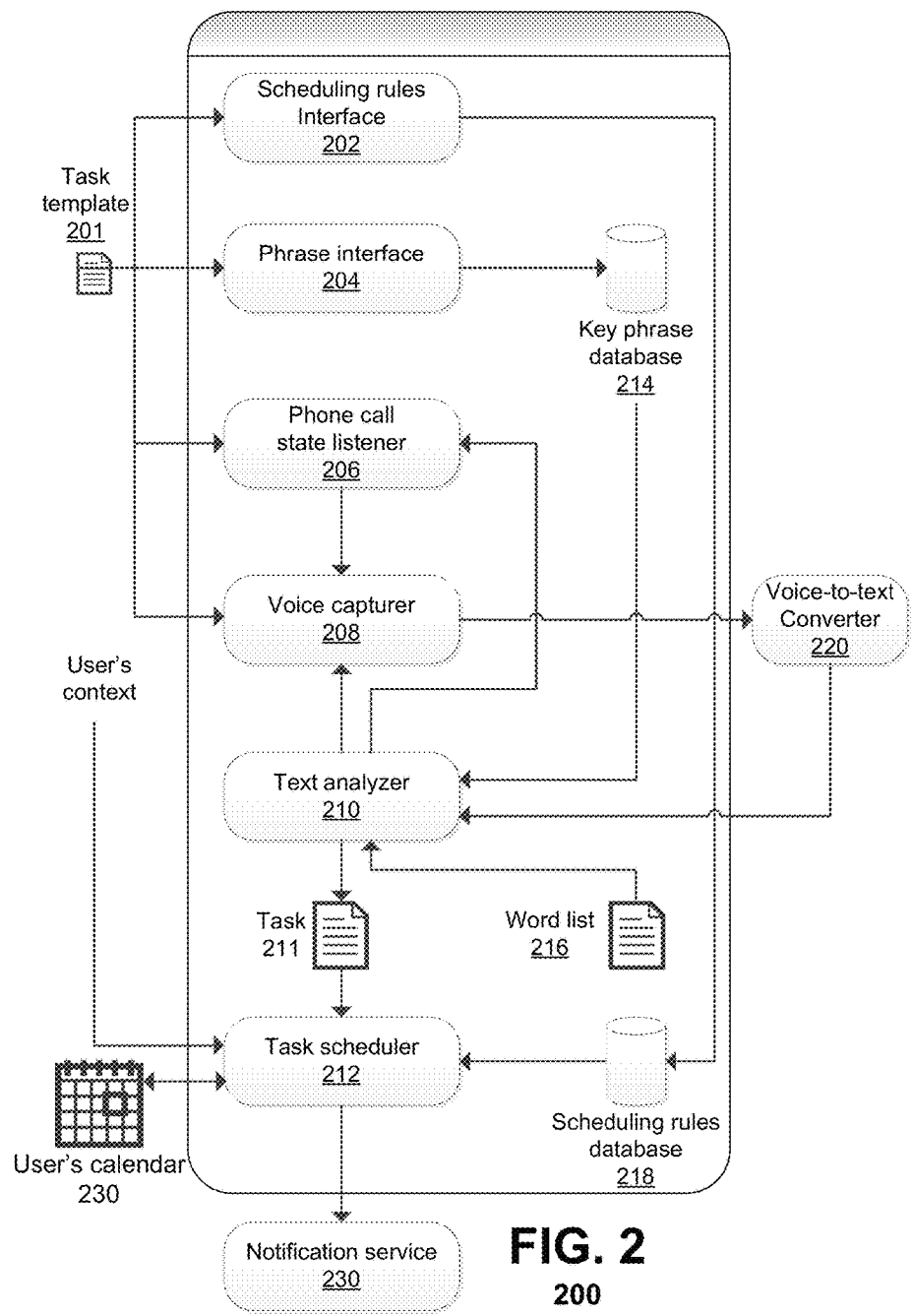
FIG. 2 illustrates a process to efficiently schedule tasks according to an embodiment.

FIG. 2 illustrates a process 200 to efficiently schedule tasks according to an embodiment. Scheduling rules interface 202, key phrase interface 204, phone call state listener 206, voice capturer 208, text analyzer 210, task scheduler 212, key phrase database 214, scheduling rules database 218, and word list 216 may operate as described above in the discussion pertaining to FIG. 1.

The user, for example, a service provider such as a plumber, may wish to capture a number of attributes that relate to the tasks (jobs) that he/she performs. For example, a plumber may wish to capture attributes such as the client's address, the type of work to be completed, the estimated cost, and the estimated job duration. The user may specify the task attributes that the user wishes to capture via a configuration file 201 (task template) and/or the key phrase interface 204. For every task attribute specified, associated key phrases may be provided via the key phrase interface 204. The specified associated key phrases may be stored in the key phrase database 214. The user may use the associated key phrases in a phone conversation with the client to capture task attribute values as previously described. Any suitable method to provide these key phrases may be used. For example, the user may provide the key phrases as text input or voice input. A suitable user interface such as a computer input device and/or microphone to capture the voice input may be utilized for this purpose.

The scheduling rules interface 202 may be used to specify the scheduling rules for optimally scheduling tasks. Every specified rule may be stored in the scheduling rules database 218.

The phone call state listener 206 may be initialized to detect changes to the user's phone call state. If the phone call state listener 206 detects that a phone call is in progress (either made or received by the user), the phone call state listener 206 may send a signal to trigger recording of the phone call by the voice capturer 208. In response, the voice capturer 208 may record the phone conversation between the user and the client. In an embodiment, only the user's side of the phone conversation may be recorded by, for example, recording the voice transmitted through the microphone or in-line device of the user's phone. In an embodiment, the conversation (or user's portion of the conversation) may be temporarily recorded. That is, data files resulting from the recording may be discarded after the respective task(s) are scheduled. The recorded audio may be transmitted by the voice capturer 208 to a voice-to-text converter 220. In an embodiment, the voice capturer 208 may directly stream the voice audio to the voice-to-text converter 220 in real-time. In an embodiment, the voice capturer 208 may pre-process the recorded audio to remove any distortions in the audio by, for example, filtering the audio. The voice to text conversion may be performed locally (on phone device), or it may be performed remotely (external to the phone device, e.g., using a cloud voice-to-text processing service). In an embodiment, the operation of the voice capturer may not affect the quality of the recorded conversation.

The converted text results may be transmitted by the voice-to-text converter 220 to the text analyzer 210. In an embodiment, the voice-to-text converter 220 may recognize a spoken word (or phrase) as one or more possible text results based on, for example, similar sounding words. Therefore, the voice-to-text converter 220 may provide more than one possible version of converted text. In an embodiment, multiple versions of a text may be ranked in terms of perceived accuracy (e.g., the first version may be considered by the voice-to-text converter 220 as more accurate than the second, and so on).

Figure 3:
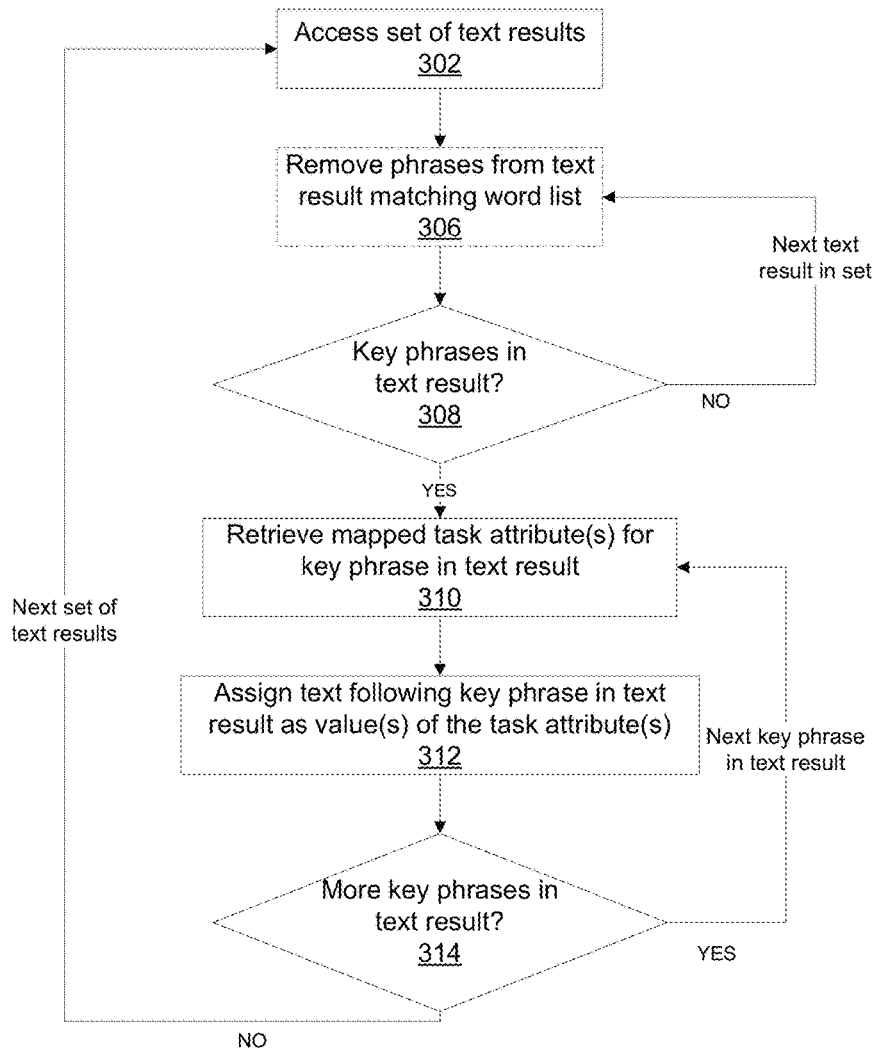
FIG. 3 illustrates a process to assign task attribute values to respective task attributes according to an embodiment.

As the number of results provided increases, the probability of finding a key phrase (from the key phrase database 214) in the set of results may increase. In different embodiments, the number of results provided per spoken word (or set of spoken words) may vary depending on the context. If a set of results is returned by the voice-to-text converter 220, each result may be analyzed by the text analyzer 210 to determine task attribute values and assign those values to respective task attributes. FIG. 3 illustrates a process diagram 300 to assign task attribute values to respective task attributes according to an embodiment. At step 302, a set of results transmitted from the voice-to-text converter 220 may be received. For each result, words or phrases from the word list 216 found in the result may be removed 306. The result may be parsed to find phrases matching key phrases defined in the key phrase database 214. If one or more key phrases are found (308), for each key phrase, the corresponding mapped task attribute(s) may be retrieved from the key phrase database 214 (310). Then, at step 312, the text following the key phrase in the result may be assigned as value(s) for the retrieved task attribute(s). If the currently analyzed text result includes more key phrases (314), steps 310-314 may be iteratively repeated for the remaining key phrases. If no more key phrases remain (314), the next set of text results may be processed by repeating steps 302-314. If no more text results remain, this may indicate that the phone conversation has ended and the text analyzer 210 may end processing.

In an embodiment, if a task attribute has been assigned value(s) based on the processing of a first set of results and new value(s) are determined from the processing of a subsequent set of results, the previous value may be overwritten with the latest value (i.e., the value from the subsequent set of results).

In an embodiment, the process 300 may be performed as described above without performing step 306. Specifically, the process 300 may be performed without removing phrases found in the word list. In this embodiment, the system may not include a word list.

Returning to FIG. 2, when the phone conversation ends, a phone state change to, for example, "idle," may be detected by the phone call state listener 206 and in response, the voice capturer may be stopped. If all the values for the task attributes have been obtained, a task 211 may be generated. This task may include all the task attribute values and may be utilized as input by the task scheduler 212 to create a corresponding task in the user's calendar 230. However, if all the values for the respective task attributes have not been obtained from the phone conversation, the user may be provided with a suitable user interface through which the user can either manually set the values, or through which the user can cancel the generation and scheduling of the task. This can occur if, for example, the user receives a personal call, in which the defined keywords have been used. If the generation and scheduling of the task is cancelled by the user, the operation of process 200 may terminate and the task may not be scheduled in the user's calendar 230.

Figure 4:
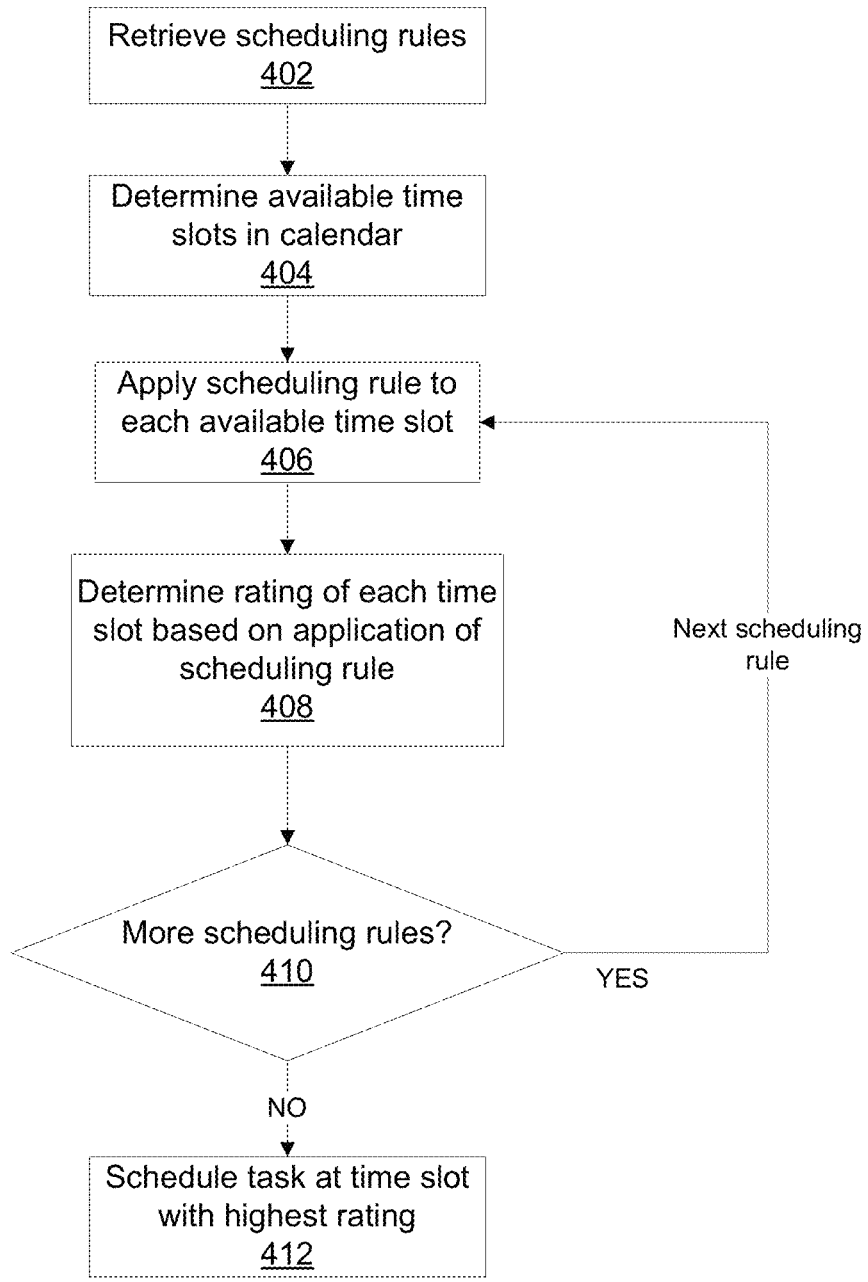
FIG. 4 illustrates a process to determine an optimal time and date to schedule a task according to an embodiment.

The creation of the task 211 may trigger the operation of the task scheduler 212. The task scheduler 212 may utilize the task 211, the user's calendar 230, information relating to the user's context, and/or the rules in the scheduling rules database 218 to schedule the task 211. The task scheduler 212 may determine an optimal time and date to schedule task 211. FIG. 4 illustrates a process 400 to determine an optimal time and date to schedule a task according to an embodiment. At step 402, scheduling rules may be retrieved from the scheduling rules database 218. The method 400 may determine available time slots in the user's calendar 230 (404). The available time slots may be derived from unscheduled times/dates in the user's calendar, the time required to perform the currently analyzed task as determined by, for example, the task's attributes, and/or proposed times for the task as determined by, for example, the task's attributes. At step 406, a rule from the retrieved scheduling rules may be applied to each determined time slot from the user's calendar 230. Depending on how each rule has been defined, this may involve the use of context information. It may also involve the use of additional software/services, for example, to calculate the geographical distance and the time required to travel between tasks. In an embodiment, the rule applied first may be the scheduling rule with the highest weight. A rating (points) for each time slot may be determined by the application of the scheduling rule (408). The rating may be calculated by evaluating the function associated with the scheduling by using the time slot as one of the input parameters as explained previously. If more scheduling rules remain (410), steps 406-410 may be iteratively repeated for each remaining rule. In an embodiment, the rules may be evaluated in weight order (from highest to lowest). Once all scheduling rules are processed, the time slot with the highest rating may be determined and the task may be scheduled in the highest rated time slot 412.

In an embodiment, the ratings of each available time slot may be calculated cumulatively when iterating through the scheduling rules. Specifically, after step 408 and before step 410, the rating of each time slot for the currently processed scheduling rule may be added to the previously calculated ratings for the respective time slot. Therefore, the final rating of a time slot will be a sum of the ratings derived from applying each scheduling rule. For example, the method 400 may be executed on two available time slots: time slot A and time slot B. The scheduling rules applied to the two time slots may be rule 1 and rule 2. In the first iteration, rule 1 may be applied to time slot A and the resulting rating may be, for example, 10. Rule 1 may then be applied to time slot B and the resulting rating may be, for example, 8. In the second iteration, rule 2 may be applied to time slot A and the resulting rating may be, for example, 4. Rule 2 may then be applied to time slot B and the resulting rating may be, for example, 9. Therefore, in this embodiment, using cumulative ratings, the final rating for time slot A may be 10+4=14. The final rating for time slot B may be 8+9=17. Therefore, the task may be scheduled in time slot B.

In an embodiment, if a predetermined threshold rating is reached for a time slot while iterating through the scheduling rules, the method 400 may stop executing steps 406-408 and immediately schedule the task in the time slot with the rating at (or above) the predetermined threshold.

In an embodiment, if a predetermined processing time is reached, the method 400 may stop executing steps 406-408 and proceed directly to step 412 (although all scheduling rules may not have been processed) to schedule the task in the time slot with the highest rating at that moment.

Once the highest rated time slot is determined and the task is scheduled in the user's calendar 230, the time, date, and/or any other details of the task may be provided to the user and/or the client (e.g., the party speaking to the user during the phone call) using a notification service 230 such as e-mail, short messaging service (SMS), multimedia messaging service (MMS), etc.

Figure 5:
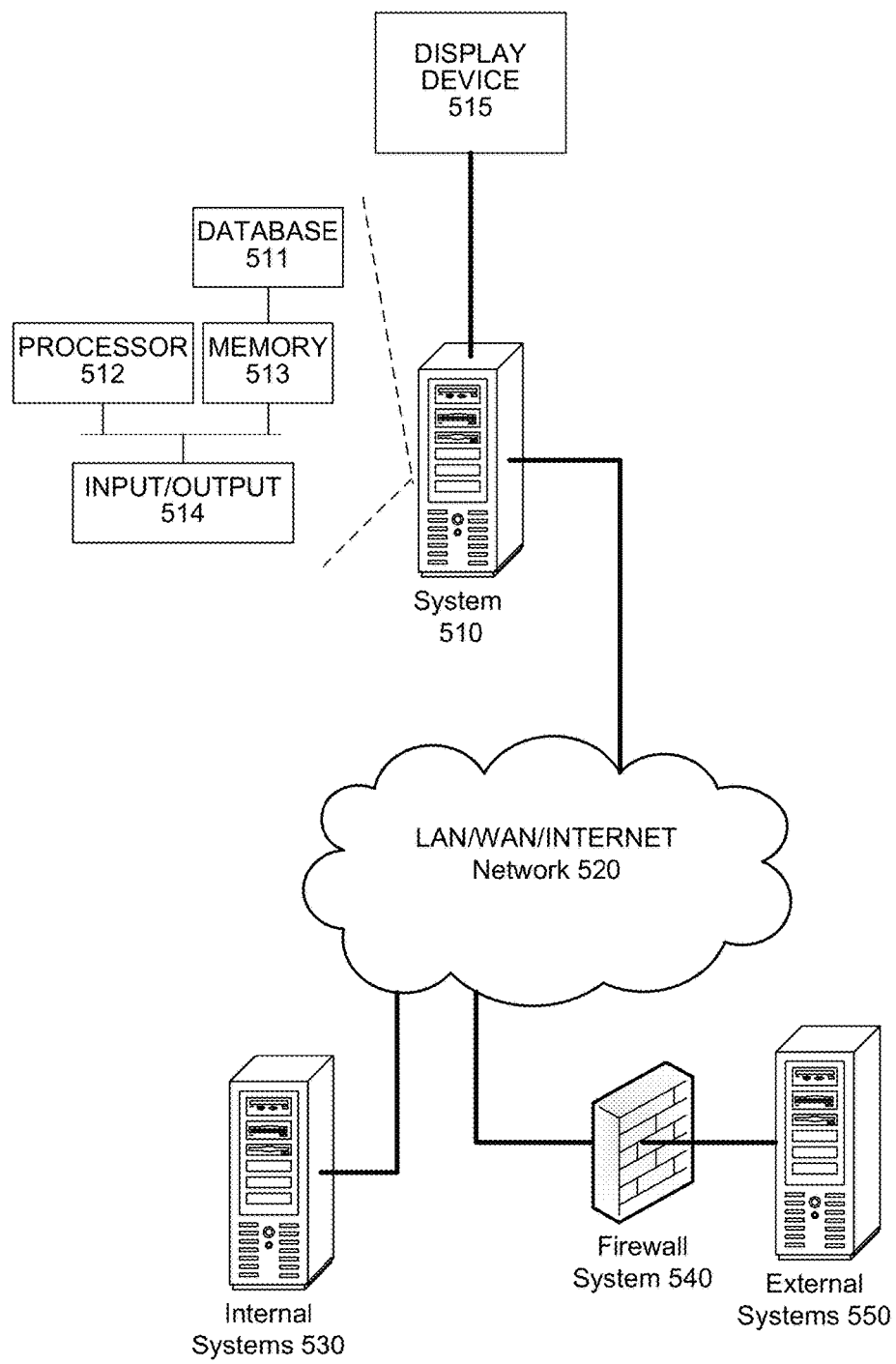
FIG. 5 shows an exemplary architecture in an embodiment.

FIG. 5 shows an exemplary architecture in an embodiment of the invention. The system 510 to optimally schedule tasks as explained above may be coupled to a display device 515, existing internal systems 530 through a network 520 and to external systems 550 through the network 520 and firewall system 540. The system 510 may include a mobile phone, smart phone, any user-wearable computer such as Google Glass™, tablet PC, desktop computer, laptop computer, client computer, central computer in a vehicle, any device with a touch screen, and any other computer. The display device 515 may include a touch screen, a tablet PC screen, a mobile phone screen, a computer monitor, and any other displays. The existing internal systems 530 may include a server and may provide business data, geographical data, calendar data, and/or other data necessary for the scheduling of tasks. The external systems 550 may include a server and may be maintained by a third party, such as an information service provider, and may include business data, geographical data, calendar data, and/or other data necessary for the scheduling of tasks, that may be updated by the third party on a periodic basis. The system 510 may interact with these external systems to obtain updates through a firewall system 540 separating the internal systems from the external systems.

While internal systems 530 and external systems 550 are included in FIG. 5, in some embodiments, one or both of these systems may not be required. In an embodiment, the functionality provided by the internal systems 530 and external systems 550 may be provided by the system 510.

Each of the systems in FIG. 5 may contain a processing device 512, memory 513, a database 511, and an input/output interface 514, all of which may be interconnected via a system bus. In various embodiments, each of the systems 510, 530, 540, and 550 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 513 may include different components for retrieving, presenting, changing, and saving data. Memory 513 may include a variety of memory devices, for example, Dynamic Random Access Memory (DRAM), Static RAM (SRAM), flash memory, cache memory, and other memory devices. Additionally, for example, memory 513 and processing device(s) 512 may be distributed across several different computers that collectively comprise a system.

Database 511 may include any type of data storage adapted to searching and retrieval. The database 511 may include SAP database (SAP DB), Informix, Oracle, DB2, Sybase, and other such database systems. The database 511 may include SAP's HANA (high performance analytic appliance) in-memory computing engine and other such in-memory databases.

Processing device 512 may perform computation and control functions of a system and comprises a suitable central processing unit (CPU). Processing device 512 may comprise a single integrated circuit, such as a microprocessing device, or may comprise any suitable number of integrated circuit devices and/or circuit boards working in cooperation to accomplish the functions of a processing device. Processing device 512 may execute computer programs, such as object-oriented computer programs, within memory 513.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, solid state drives, or DVD ROM; the Internet or other propagation medium; or other forms of RAM or ROM.

We claim:

1. A computer-implemented method for implementation by a computer processor forming part of a mobile phone, the mobile phone comprising:

automatically detecting, by a phone call state has changed indicating that a phone conversation has commenced on the mobile phone;

sending, by the computer processor, a signal to trigger recording of the phone conversation;

capturing, by the computer processor and in response to the sent signal, at least a portion of the phone conversation on the mobile phone in a data file;

receiving, by the computer processor, text results of the at least a portion of the phone conversation, retrieving, by the computer processor, key phrases and respective task attributes mapped to the key phrases from a database;

identifying, by the computer processor, at least one key phrase from the key phrases in the text results;

assigning, by the computer processor, text following the at least one key phrase in the text results as at least one task attribute value of at least one task attribute mapped to the at least one key phrase; and scheduling, by the computer processor, a task corresponding to the at least one task attribute value in a calendar; and discarding, by the computer processor, the data file after the task is scheduled;

wherein the scheduling includes:
retrieving, by the computer processor, scheduling rules from the database;
determining, by the computer processor, available time slots in the calendar;
iteratively applying, by the computer processor, each scheduling rule from the scheduling rules to each available time slot from the available time slots;
determining, by the computer processor, a respective rating of the each available time slot based on the application of the each scheduling rule; and
scheduling, by the computer processor, the task in an available time slot with a highest respective rating.

2. The method of claim 1, further comprising:
prior to the assigning, removing by the computer processor from the text results, phrases matching phrases from a word list.

3. The method of claim 1, wherein the available time slots are determined based on the at least one task attribute value.

4. The method of claim 1, wherein only portions of the phone conversation spoken by a user of the phone are captured and portions of the of the phone conversation spoken by remote participants in the phone conversation are not captured.

5. The method of claim 1, wherein, in response to scheduling the task, a notification is sent to at least one participant of the phone conversation with details associated with the task.

6. An apparatus comprising:
a processor forming part of a mobile phone to:
automatically detect, by a phone call state listener, that a phone call state has changed indicating that a phone conversation has commenced on the mobile phone;
send a signal to trigger recording of the phone conversation;
capture, in response to the sent signal, at least a portion of the phone conversation on the mobile phone in a data file;
receive text results of the at least a portion of the phone conversation, wherein the text results are obtained from conversion of the at least a portion of the phone conversation to text;
retrieve key phrases and respective task attributes mapped to the key phrases from a database;
identify at least one key phrase from the key phrases in the text results;
assign text following the at least one key phrase in the text results as at least one task attribute value of at least one task attribute mapped to the at least one key phrase;
schedule a task corresponding to the at least one task attribute value in a calendar; and
discard the data file after the task is scheduled;

wherein the scheduling includes:
retrieving scheduling rules from the database;
determining available time slots in the calendar;
iteratively applying each scheduling rule from the scheduling rules to each available time slot from the available time slots;
determining a respective cumulative rating of the each available time slot based on the application of the each scheduling rule based on a cumulative rating for each applied scheduling rule; and
scheduling the task in an available time slot with a highest respective cumulative rating.

7. The apparatus of claim 6, wherein the processor is further configured to:
prior to the assigning, remove, from the text results, phrases matching phrases from a word list.

8. The apparatus of claim 6, wherein the available time slots are determined based on the at least one task attribute value.

9. The apparatus of claim 6, wherein only portions of the phone conversation spoken by a user of the phone are captured and portions of the of the phone conversation spoken by remote participants in the phone conversation are not captured.

10. The apparatus of claim 6, wherein, in response to scheduling the task, a notification is sent to at least one participant of the phone conversation with details associated with the task.

11. A non-transitory computer-readable medium embodied with computer-executable instructions for causing a computer processor forming part of a mobile phone to execute instructions, the computer instructions comprising:
automatically detecting, by a phone call state listener, that a phone call state has changed indicating that a phone conversation has commenced on the mobile phone;
sending a signal to trigger recording of the phone conversation;
capturing, in response to the sent signal, at least a portion of the phone conversation on the mobile phone in a data file;
receiving text results of the at least a portion of the phone conversation, wherein the text results are obtained from conversion of the at least a portion of the phone conversation to text;
retrieving key phrases and respective task attributes mapped to the key phrases from a database;
identifying at least one key phrase from the key phrases in the text results;
assigning text following the at least one key phrase in the text results as at least one task attribute value of at least one task attribute mapped to the at least one key phrase;
scheduling a task corresponding to the at least one task attribute value in a calendar; and
discarding the data file after the task is scheduled;
wherein the scheduling includes:
retrieving scheduling rules from the database;
determining available time slots in the calendar;
iteratively applying each scheduling rule from the scheduling rules to each available time slot from the available time slots;

determining a respective cumulative rating of the each available time slot based on the application of the each scheduling rule based on a cumulative rating for each applied scheduling rule; and scheduling the task in an available time slot with a highest respective cumulative rating.

12. The computer-readable medium of claim 11, wherein the computer instructions further comprise:

prior to the assigning, removing, from the text results, phrases matching phrases from a word list.

13. The computer-readable medium of claim 11, wherein the available time slots are determined based on the at least one task attribute value.

14. The computer-readable medium of claim 11, wherein only portions of the phone conversation spoken by a user of the phone are captured and portions of the of the phone conversation spoken by remote participants in the phone conversation are not captured.

15. The computer-readable medium of claim 11, wherein, in response to scheduling the task, a notification is sent to at least one participant of the phone conversation with details associated with the task.

16. The method of claim 1 further comprising: determining a location of the user; wherein the scheduling takes into account an amount of time for the user to travel from one location to another.

17. The method of claim 16, wherein the location is determined using global positioning system (GPS) or cell phone tower triangulation.

18. The apparatus of claim 6, wherein the operations further comprise:

determining a location of the user; wherein the scheduling takes into account an amount of time for the user to travel from one location to another.

19. The computer-readable medium of claim 11, wherein the operations further comprise:

determining a location of the user; wherein the scheduling takes into account an amount of time for the user to travel from one location to another.

* * * * *